United States Patent
Baba et al.

(10) Patent No.: US 7,728,733 B2
(45) Date of Patent: Jun. 1, 2010

(54) RFID TAG AND RFID TAG PRODUCTION METHOD

(75) Inventors: Shunji Baba, Kawasaki (JP); Shigeru Hashimoto, Tokyo (JP); Yoshiyasu Sugimura, Tokyo (JP); Tsuyoshi Niwata, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 757 days.

(21) Appl. No.: 11/655,178

(22) Filed: Jan. 19, 2007

(65) Prior Publication Data

US 2008/0042851 A1    Feb. 21, 2008

(30) Foreign Application Priority Data

Aug. 10, 2006    (JP)    ............................. 2006-218587

(51) Int. Cl.
    G08B 13/14    (2006.01)
    G06K 19/06    (2006.01)

(52) U.S. Cl. .............. 340/572.7; 340/572.1; 340/572.6; 340/572.8; 156/249

(58) Field of Classification Search .............. 340/572.7, 340/572.1, 572.6, 572.8; 156/249; 235/492
    See application file for complete search history.

(56) References Cited

U.S. PATENT DOCUMENTS

| | | | |
|---|---|---|---|
| 5,200,601 A | | 4/1993 | Jarvis |
| 5,852,289 A | | 12/1998 | Masahiko |
| 5,982,284 A | * | 11/1999 | Baldwin et al. .......... 340/572.8 |
| 6,091,333 A | * | 7/2000 | Oshima .................... 340/572.1 |
| 6,720,877 B2 | * | 4/2004 | Lian et al. ................. 340/572.8 |
| 6,995,674 B2 | * | 2/2006 | Turner et al. ............. 340/572.8 |
| 7,247,214 B2 | * | 7/2007 | Chamandy et al. .......... 156/249 |
| 7,385,512 B2 | * | 6/2008 | Shih et al. ................ 340/572.7 |
| 7,413,130 B2 | | 8/2008 | Inoue et al. |
| 7,612,677 B2 | * | 11/2009 | Rietzler .................... 340/572.8 |

FOREIGN PATENT DOCUMENTS

| | | |
|---|---|---|
| CN | 1658232 A | 8/2005 |
| EP | 1 522 957 | 4/2005 |
| JP | 8-282167 | 10/1996 |
| JP | 2000-200332 | 7/2000 |
| JP | 2000-311176 | 11/2000 |
| JP | 2001-351082 | 12/2001 |
| JP | 2005-4429 | 1/2005 |

OTHER PUBLICATIONS

Chinese Office Action issued on Mar. 13, 2009 in corresponding Chinese Patent Application -200710008181.2.
Office Action mailed on Jan. 28, 2010 and issued in corresponding Taiwanese Patent Application No. 95149496.
Extended European Search Report issued in corresponding European Patent Application No. 06127351.2 on Mar. 30, 2010.

* cited by examiner

*Primary Examiner*—Davetta W Goins
(74) *Attorney, Agent, or Firm*—Staas & Halsey LLP

(57) ABSTRACT

The RFID tag includes: a main unit consisting of a base, a communication antenna that is wired on the base, a circuit chip that is electrically connected to the antenna and performs radio communication via the antenna, a chip reinforcing member covering the periphery of the circuit chip, an underside reinforcing member that is disposed at a position that sandwiches the base with respect to the chip reinforcing member, and a rubber cover member that covers these components; and protective layers that sandwich the main unit from the front and rear sides and have greater slipperiness than the slipperiness between the main unit and a contactant.

11 Claims, 5 Drawing Sheets

RFID TAG AND RFID TAG PRODUCTION METHOD

CROSS REFERENCE TO RELATED APPLICATIONS

This application claims the benefit under 35 U.S.C. Section 119, of Japanese Patent Application No. 2006-218587, filed Aug. 10, 2006, which is hereby incorporated by reference in its entirety into this application.

BACKGROUND OF THE INVENTION

1. Field of the Invention

The present invention relates to an RFID (Radio Frequency Identification) tag which exchanges information with an external device in a non-contact manner, and an RFID tag production method that produces that kind of RFID tag. Note that this "RFID tag" may also be referred to as a "wireless IC tag".

2. Description of the Related Art

Various types of RFID tags that exchange information with an external device, typically represented by a reader/writer, in a non-contact manner using radio waves have been proposed in recent years (for example, see Japanese Patent Laid-Open No. 2000-311176, Japanese Patent Laid-Open No. 2000-200332, and Japanese Patent Laid-Open No. 2001-351082). An RFID tag in which a circuit chip and a radio wave communication antenna pattern are mounted on a base sheet made of plastic or paper has been proposed as one type of such RFID tag. This type of RFID tag is designed to be used in a mode in which the RFID tag is attached to an article and identification of the article and the like can be performed by exchanging information relating to that article with an external device.

As one example of a method of attaching this kind of RFID tag, a method may be mentioned that uses an adhesive sheet that has adhesive applied on either the front or rear surface. According to this method, an RFID tag is attached to an article by affixing this adhesive sheet to the surface of the article in a manner that sandwiches the RFID tag between the surface of the article and the surface (adhesive surface) on which the adhesive was applied.

The usage modes for RFID tags include a mode in which an RFID tag is attached to article that changes shape easily, such as clothing, and the above described attachment method using an adhesive sheet is sometimes employed as a method of attaching an RFID tag to this kind of article. However, in an attachment method that uses an adhesive sheet, the RFID tag is rigidly fixed to the article and, as a result, changes in the shape of the article are transmitted as they are to the RFID tag. An RFID tag has sections that are structurally vulnerable to tensile stress, such as a connection part between an antenna and a circuit chip, and when a tensile stress is produced by changes in shape that are transmitted to the RFID tag from the article, there is a fear of a failure occurring in which the RFID tag breaks.

SUMMARY OF THE INVENTION

The present invention has been made in view of the above circumstances and provides an RFID tag in which the occurrence of failures such as a breakage are suppressed, as well as an RFID tag production method that produces this kind of RFID tag.

An RFID tag according to the present invention includes:

a main unit consisting of a base, a communication antenna that is wired on the base, and a circuit chip that is electrically connected to the antenna and performs radio communication via the antenna; and protective layers that sandwich the main unit from the front and rear sides, and have greater slipperiness than a slipperiness between the main unit and a contactant.

As used herein, the phrase "slipperiness between the main unit and a contactant" refers to the degree of adhesiveness when the contactant is, for example, an adhesive, and refers to the degree of friction when the contactant is, for example, an article without adhesiveness.

According to the RFID tag of the present invention, for example, when the RFID tag is attached to an article using an adhesive sheet as described above, the protective layers contact against the adhesive surface of the adhesive sheet and the surface of the article. Since the slipperiness of the protective layers is greater than the slipperiness between those surfaces and the main unit, for example, even if the article changes shape the protective layers slip with respect to the surface of the article and the adhesive surface of the adhesive sheet, and thus transmission of a change in shape that generates tensile stress on the RFID tag is inhibited and, as a result, the occurrence of a failure such as a breakage in the RFID tag is suppressed.

In this case, a preferred form of the RFID tag of the present invention is one in which "the main unit includes a cover member that covers the base, the antenna and the circuit chip".

According to this preferred form of the RFID tag, since the cover member that covers the base, the antenna and the circuit chip further inhibits the transmission of changes in shape to these elements, the occurrence of a failure such as a breakage in the RFID tag is suppressed still further.

Further, according to the RFID tag of the present invention, a form in which "the main unit includes a chip reinforcing member that covers at least a periphery of the circuit chip and a part of a wiring of the antenna, at least in an upper side with respect to the base designated as a bottom," or a form in which "the main unit includes:

a chip reinforcing member that covers at least a periphery of the circuit chip and a part of a wiring of the antenna with respect to at least an upper part when having the base as a bottom; and an underside reinforcing member that is disposed at a position that sandwiches the base with respect to the chip reinforcing member" is also a preferred form.

According to these preferred forms of the RFID tag, the transmission of changes in shape to the circuit chip that is particularly vulnerable to changes in shape or a peripheral portion thereof is further inhibited by the chip reinforcing member or a combination of the chip reinforcing member and the underside reinforcing member, and thus the occurrence of a failure such as a breakage in the RFID tag is suppressed still further.

Further, in these preferred forms of the RFID tag, a form in which "the chip reinforcing member covers one part of the antenna wiring and only the periphery of the circuit chip" is a further preferable form.

According to this further preferable form of the RFID tag, while the circuit chip is protected by the chip reinforcing member covering the periphery of the circuit chip, the upper part of the circuit chip is in an open state, and thus a thinner version of the RFID tag can be made.

Further, an RFID tag production method according to the present invention includes:

a main unit preparation process that prepares a main unit consisting of a base, a communication antenna that is wired on the base, and a circuit chip that is electrically connected to the antenna and performs radio communication via the antenna; and a protective layer formation process that forms at the same time as the main unit preparation process or after the main unit preparation process, protective layers that sandwich the main unit from the front and rear sides and have greater slipperiness than a slipperiness between the main unit and a contactant.

In this case, the phrase "forms at the same time as the main unit preparation process or after the main unit preparation process" refers to the fact that, for example, when the main unit preparation process is a process that prepares a main unit including a cover member as described later, the protective layer formation process may be a process that forms protective layers such that the base, the antenna and the circuit chip are covered with a cover member having the protective layers at the same time as preparing the cover member, or may be a process that forms the protective layers after a main unit that includes a cover member was prepared.

According to this RFID tag production method of the present invention, an RFID tag according to the present invention that suppresses the occurrence of failures such as a breakage can be easily produced.

In this case, according to the RFID tag production method of the present invention, a form in which "the main unit preparation process is a process that prepares, as the above described main unit, a main unit that includes a cover member that covers the base, the antenna and the circuit chip" is a preferable form.

According to this preferable form of the RFID tag production method, since the cover member that covers the base, the antenna and the circuit chip further inhibits the transmission of changes in shape to these elements, the occurrence of a failure such as a breakage in the RFID tag is suppressed still further.

Further, according to the RFID tag production method of the present invention, a form in which "the main unit preparation process is a process that prepares, as the above described main unit, a main unit that includes a chip reinforcing member that covers at least a periphery of the circuit chip and a part of a wiring of the antenna, at least in an upper side with respect to the base designated as a bottom," or a form in which "the main unit preparation process is a process that prepares, as the above described main unit, a main unit that includes a chip reinforcing member that covers at least a periphery of the circuit chip and a part of a wiring of the antenna with respect to at least an upper part when having the base as a bottom, and an underside reinforcing member that is disposed at a position that sandwiches the base with respect to the chip reinforcing member" is also a preferred form.

According to these preferred forms of the RFID tag production method, since the transmission of changes in shape to the circuit chip that is particularly vulnerable to changes in shape or a peripheral portion thereof is further inhibited by the chip reinforcing member or a combination of the chip reinforcing member and the underside reinforcing member, the occurrence of a failure such as a breakage in the RFID tag is suppressed still further.

Further, in these preferred forms of the RFID tag production method, a form in which "the main unit preparation process is a process that prepares, as the above described main unit, a main unit having a chip reinforcing member that covers a part of the antenna wiring and only the periphery of the circuit chip as the above described chip reinforcing member" is a further preferable form.

According to this further preferable form of the RFID tag production method, while the circuit chip is protected by the chip reinforcing member covering the periphery of the circuit chip, the upper part of the circuit chip is in an open state, and thus a thinner version of the RFID tag can be made.

As described above, according to the present invention there can be provided an RFID tag in which the occurrence of failures such as a breakage are suppressed, as well as an RFID tag production method that produces this kind of RFID tag.

DETAILED DESCRIPTION OF THE INVENTION

Embodiments of the present invention will be described below with reference to the drawings.

Figure 1:
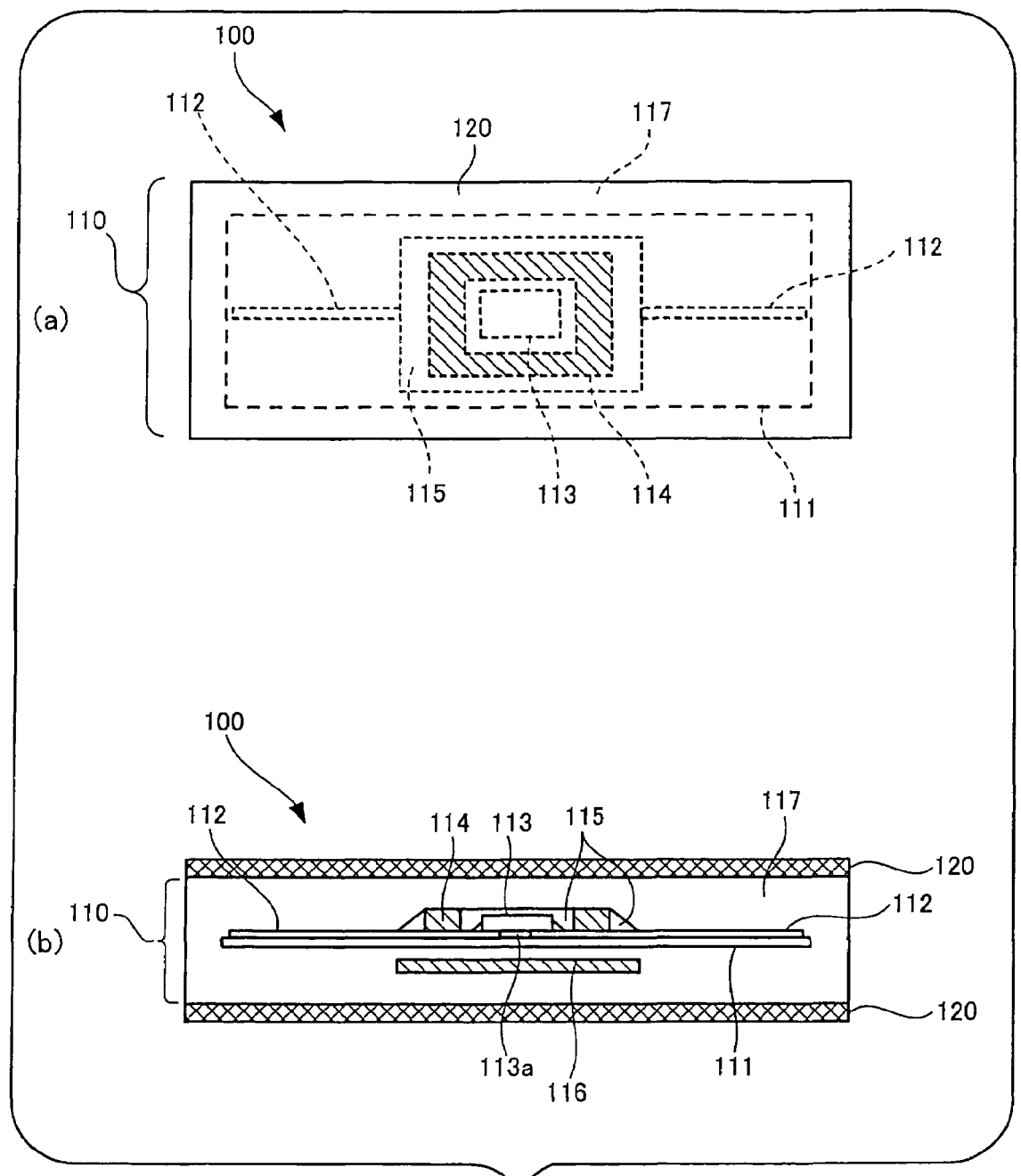
FIG. 1 is a schematic diagram that illustrates an embodiment of an RFID tag according to the present invention.

FIG. 1 is a schematic diagram that illustrates an embodiment of an RFID tag according to the present invention.

Part (a) of FIG. 1 is a top view of an RFID tag 100 as an embodiment of the RFID tag according to the present invention, in which the inner structure of the RFID tag is shown in a transparent state and part (b) of FIG. 1 shows a cross section in the longitudinal direction of the RFID tag 100.

The RFID tag 100 shown in FIG. 1 is an RFID tag which it is assumed will be attached to an article that changes shape easily, such as clothing. The RFID tag 100 has a main unit 110 that consists of a base 111 that is formed with PET film; a communication antenna 112 that is wired on the base 111; a circuit chip 113 that is electrically connected to the antenna 112 and is adhered and fixed to the base 111 by an adhesive 113a and carries out radio communication via the antenna 112; a chip reinforcing member 114 made of fiber-reinforced resin that covers the periphery of the circuit chip 113 in a state in which the upper part thereof is open and which is adhered and fixed to the base 111 by a thermosetting adhesive 115; an underside reinforcing member 116 that is made of a plastic sheet and is disposed at a position that sandwiches the base 111 with respect to the chip reinforcing member 114; and a cover member 117 that is made of rubber and which covers the aforementioned components. The RFID tag 100 further includes protective layers 120 that are formed of a silicone parting agent and which sandwich the main unit 110 from the front and rear sides.

The base 111, the antenna 112, the circuit chip 113, the chip reinforcing member 114, the underside reinforcing member 116, the cover member 117 and the protective layers 120 respectively correspond to an example of the base, antenna, circuit chip, chip reinforcing member, underside reinforcing member, cover member and protective layers according to the present invention. The above body 110 corresponds to one example of the body of the present invention.

In this case, it is assumed that the RFID tag 100 as shown in FIG. 1 is attached to an article such as clothing by the following method that is often employed as a common attachment method.

Figure 2:
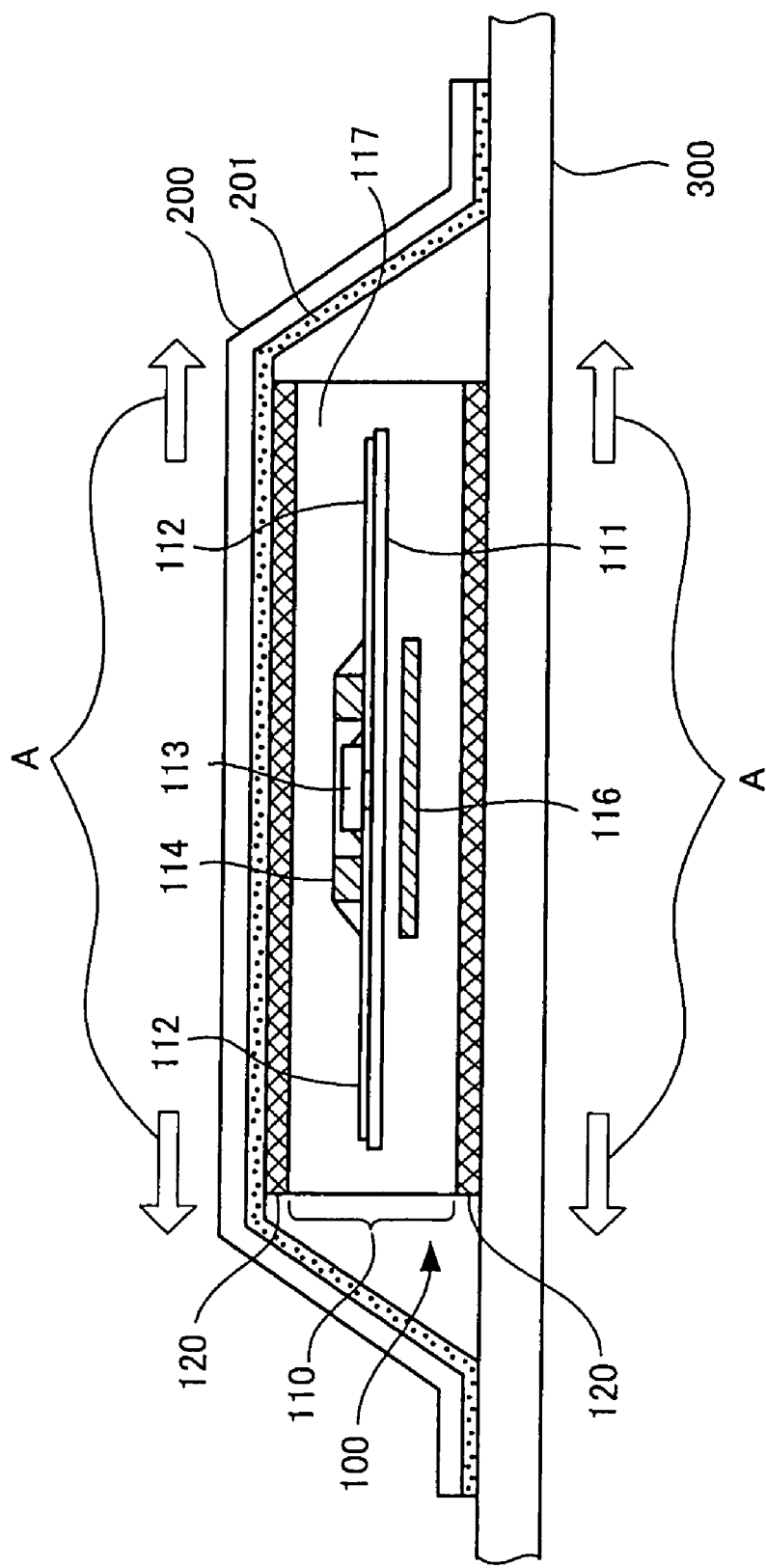
FIG. 2 is a schematic diagram that illustrates a state in which an RFID tag 100 is attached to an article.

FIG. 2 is a schematic diagram that illustrates a state in which the RFID tag 100 is attached to an article.

In FIG. 2, the RFID tag 100 is attached to an article 300 by affixing an adhesive sheet 200 having a thermosetting adhesive 201 applied on either the front or rear surface thereof to the front surface of the article 300 such that the RFID tag 100 is inserted between the front surface of the article 300 and the surface (adhesive surface) on which the adhesive 201 is applied.

At this time, since the protective layers 120 that contact against the adhesive surface of the adhesive sheet 200 are made of a silicone parting agent as described above and have low adhesiveness, the RFID tag 100 is attached to the article 300 without adhering to the adhesive surface of the adhesive sheet 200. Further, the silicone parting agent that constitutes the protective layers 120 is a material that has low friction with respect to contact with the article 300 that is, for example, clothing.

We will now consider a case in which the article 300 stretches in the direction indicated by the arrow A in the figure. In this case, if we suppose, for example, that the RFID tag 100 is adhered to the adhesive surface of the adhesive sheet 200 and rigidly fixed to the article 300, changes in the shape of the article 300 are transmitted as they are to the RFID tag 100 and there is a high possibility of a tensile stress being generated that has a risk of producing a disconnection at a section that connects the circuit chip 113 and the antenna 112. However, according to the present embodiment, by provision of the protective layers 120 the RFID tag 100 is attached without adhering to the adhesive surface of the adhesive sheet 200. Further, the surfaces of the protective layers 120 have low friction with respect to contact with a contactant. Thus, even if the article 300 stretches in the direction indicated by the arrow A in the figure, slippage occurs between the protective layer 120 and the contact surface of the adhesive sheet 200 and also between the protective layer 120 and the surface of the article 300, and thus stretching of the article 300 is hardly transmitted to the RFID tag 100 and occurrence of the above described tensile stress is inhibited. Further, the present embodiment is configured such that transmission of changes in shape to a peripheral section of the circuit chip 113 that is, among the parts of the RFID tag 100, particularly vulnerable to changes in shape, is further suppressed by the cover member 117 that is made of rubber, the chip reinforcing member 114 made of fiber-reinforced resin, or the underside reinforcing member 116 made of a plastic sheet. According to this configuration, the RFID tag 100 of the present embodiment is attached to the article 300 in a state in which the occurrence of failures such as a breakage is suppressed.

Next, an example of a method of producing the RFID tag 100 is described.

Figure 3:
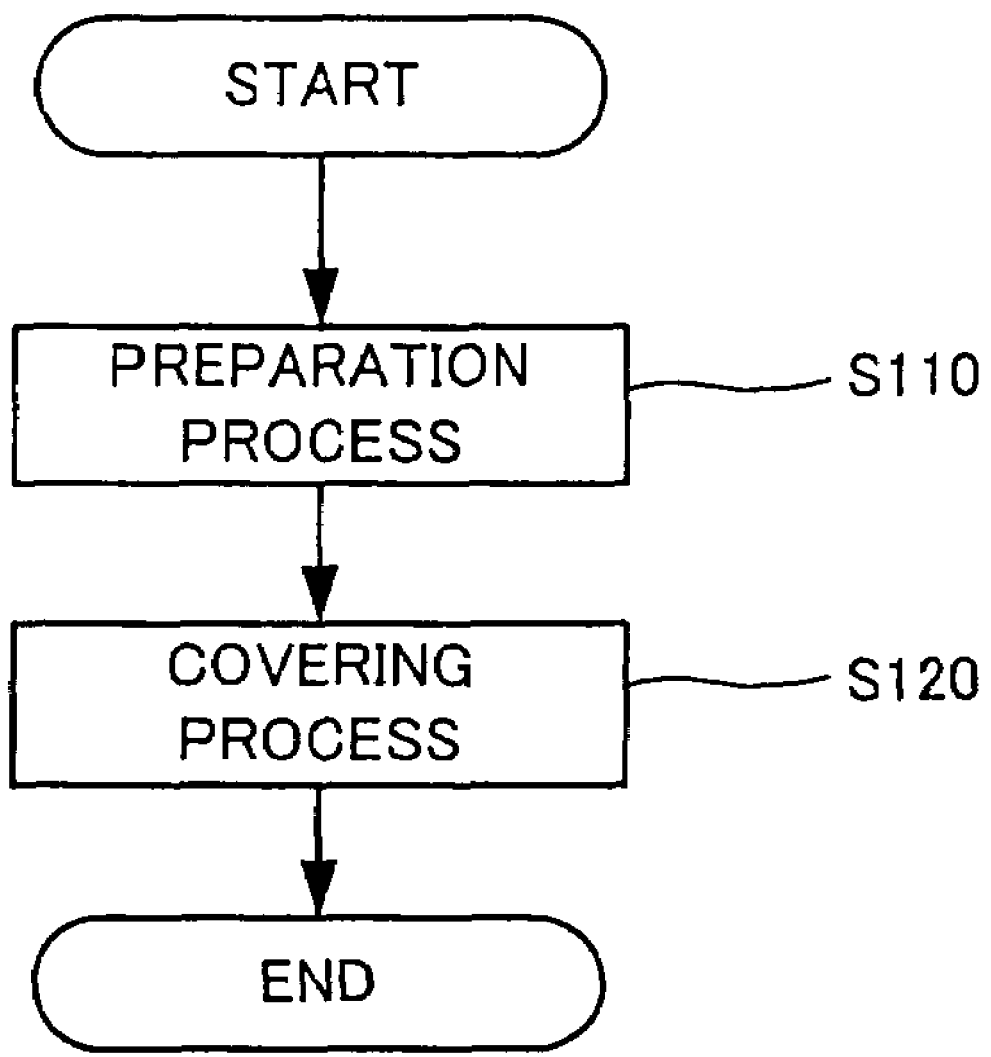
FIG. 3 is a flowchart that illustrates an example of a method of producing the RFID tag 100 shown in FIG. 1 and FIG. 2.

FIG. 3 is a flowchart that illustrates an example of a method of producing the RFID tag 100 shown in FIG. 1 and FIG. 2.

The production method illustrated in the flowchart of FIG. 3 has a preparation process (step S110) that prepares an element in which the circuit chip 113 and the chip reinforcing member 114 are mounted on the base 111 on which the antenna 112 was wired, and a covering process (step S120) of covering the element that was prepared in the preparation process.

First, the preparation process (step S110) is described.

Figure 4:
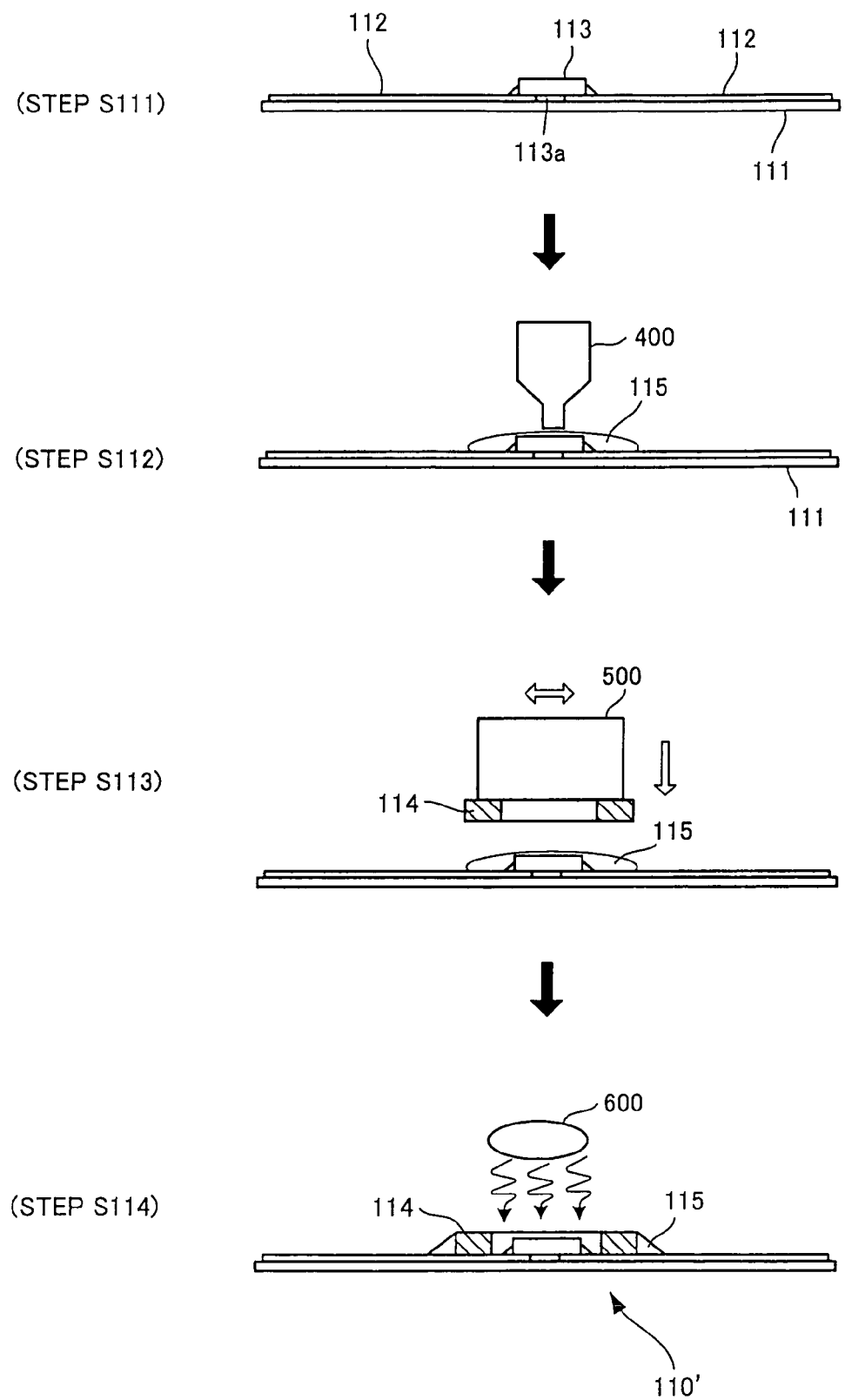
FIG. 4 is a view that illustrates in detail a preparation process (step S110) in the flowchart shown in FIG. 3.

FIG. 4 is a view that illustrates in detail the preparation process (step S110) in the flowchart shown in FIG. 3.

In this preparation process, first, the circuit chip 113 is mounted on the base 111 that has the antenna 112 formed on the surface thereof (step S111). Since a method of mounting the circuit chip 113 is known, a detailed description is omitted here.

When the circuit chip 113 is mounted in step S111, next a dispenser 400 applies the thermosetting adhesive 115 onto the base 111 so that the circuit chip 113 is surrounded by the adhesive 115 (step S112). Next, a mount tool 500 transports the chip reinforcing member 114 to a position directly above the circuit chip 113, and mounts the chip reinforcing member 114 on the base 111 so that the circuit chip 113 is housed within the chip reinforcing member 114 (step 113). Subsequently, the thermosetting adhesive 115 is heated with a heat source 600 to harden the adhesive 115 (step S114).

The element prepared in the above described preparation process on which the circuit chip 113 and the chip reinforcing member 114 were mounted on the base 111 on which the antenna 112 was wired is referred to hereunder as a main unit inlay 110' as an internal structural element (inlay) of the main unit 110 in the RFID tag 100.

Next, the covering process (step S120) shown in the flowchart of FIG. 3 is described.

Figure 5:
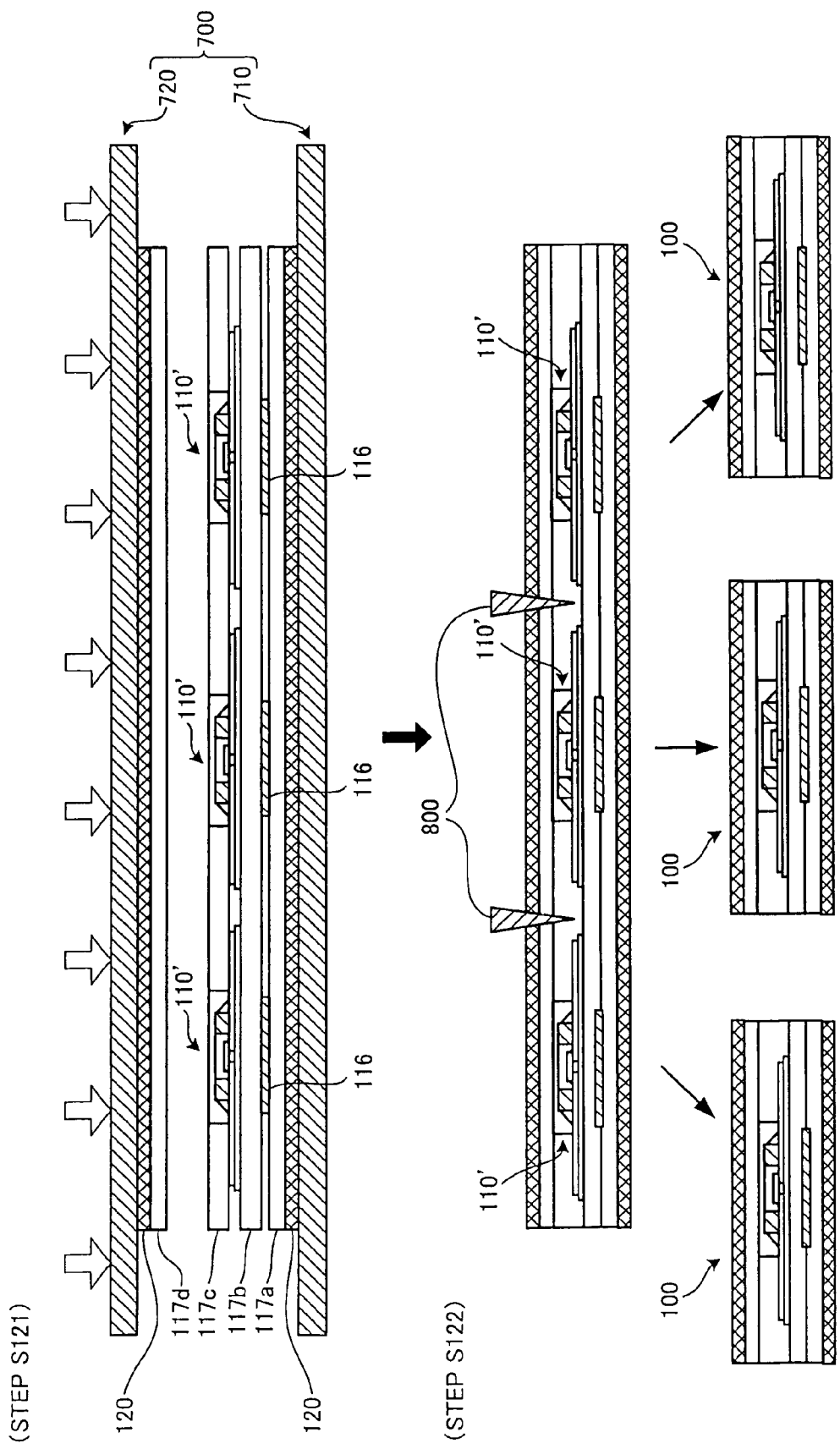
FIG. 5 is a view that illustrates in detail a covering process (step S120) in the flowchart shown in FIG. 3.

FIG. 5 is a view that illustrates in detail the covering process (step S120) in the flowchart shown in FIG. 3.

In this covering process, covering is executed for three RFID tags 100 in one round of processing.

In this covering process, a press apparatus 700 is used that sandwiches a target object between a press stage 710 and a press head 720 and pressurizes and heats that target object.

Upon obtaining the main unit inlay 110' in the preparation process (step S110), the following pressurizing and heating process is executed (step S121).

First, a rubber sheet 117a that is the bottom layer among four rubber sheets 117a . . . 117d that form a cover member 117 that covers the main unit inlay 110' is placed on the press stage 710. In this case, protective layers 120 consisting of a silicone parting agent are previously formed on either the front or rear surface of the rubber sheet 117a that is the undermost layer and the rubber sheet 117d that is the uppermost layer, respectively. The rubber sheet 117a that is the undermost layer is placed on the press stage 710 in a condition whereby the rubber sheet 117a has the protective layer 120 underneath. Next, three underside reinforcing members 116 are placed in a row on top of the rubber sheet 117a that is the undermost layer. Subsequently, the rubber sheet 117b that is the second layer from the bottom is laid over the three underside reinforcing members 116, and three main unit inlays 110' are then placed at positions facing the three underside reinforcing members 116, respectively, in a condition sandwiching the rubber sheet 117b. Next, the rubber sheet 117c that is the third layer from the bottom is laid over the three main unit inlays 110'. In this case, as shown in FIG. 5, openings that can house the chip reinforcing member 114 of each main unit inlays 110' are provided in the rubber sheet 117c that is the third layer from the bottom, and the rubber sheet 117c is disposed so as to house each chip reinforcing member 114 in the respective openings. Finally, the rubber sheet 117d that is the uppermost layer is laid over the rubber sheet 117c that is the third layer in a condition in which the protective layer 120 is on the top of the rubber sheet 117d.

When the four rubber sheets 117a . . . 117d, the underside reinforcing member 116 and the main unit inlay 110' are placed on the press stage 710 in this manner, the press head 720 descends onto the uppermost rubber sheet 117d. Then, in the press apparatus 700, the four rubber sheets 117a . . . 117d, the underside reinforcing member 116 and the main unit inlay 110' that are sandwiched between the press stage 710 and the press head 720 are pressurized and heated. By means of this pressurization and heating, the four rubber sheets 117a . . . 117d are united in a state in which the underside reinforcing members 116 and the main unit inlays 110' of the three RFID tags 100 are embedded therein. As a result, an object is formed in which three RFID tags 100 are connected in which the underside reinforcing members 116 and the main unit inlays 110' are covered by the cover member 117 made of rubber and are sandwiched by the protective layers 120.

Following the process of step S121, a cutter 800 descends between the main unit inlays 110' to make a cut into three pieces and thereby obtain three separate RFID tags 100 (step S122).

According to the production method described above, the RFID tag 100 shown in FIG. 1 and FIG. 2 can be easily produced.

Although the main unit 110 having the chip reinforcing member 114, the underside reinforcing member 116 and the cover member 117 in addition to the base 110, the antenna 112 and the circuit chip 113 was exemplified above as one example of the main unit according to the present invention, the present invention is not limited thereto. The main unit according to the present invention may be, for example, a unit having only three elements consisting of the base, the antenna and the circuit chip, or may be a unit having, in addition to the other three elements, for example, only the chip reinforcing member, or a unit having only the cover member, or a unit having only the chip reinforcing member and the cover member. In this case, when the main unit has only three elements consisting of the base, the antenna and the circuit chip, or when the main unit has only the chip reinforcing member 114 in addition to these three elements or the like, these elements that constitute the main unit are directly sandwiched by the protective layers.

Further, although the protective layers 120 made of a silicone parting agent were exemplified above as one example of protective layers according to the present invention, the present invention is not limited thereto, and the protective layers according to the present invention may be made of, for example, Teflon (registered trademark).

Further, although the chip reinforcing member 114 made of fiber-reinforced resin was exemplified above as one example of a chip reinforcing member according to the present invention, and the kind of fiber-reinforced resin was not specified, the fiber-reinforced resin that forms the chip reinforcing member according to the present invention may be, for example, FRP (Fiber Reinforced Plastics) or glass epoxy resin. Further, a chip reinforcing member according to the present invention is not limited to one made of this kind of fiber-reinforced resin, and for example, may be made of thermoplastic, or may be made of thermosetting resin or the like.

Further, although thermosetting adhesive was exemplified above as the adhesive that adheres and fixes the chip reinforcing member 114 to the base 111, the present invention is not limited thereto, and this adhesive may be an ultraviolet-curable adhesive, an anaerobic adhesive, a moisture curable adhesive, or a two-part adhesive.

Further, although the underside reinforcing member 116 made of a plastic sheet was exemplified above as one example of the underside reinforcing member according to the present invention, the present invention is not limited thereto, and the underside reinforcing member according to the present invention may be, for example, a member formed with a nylon (registered trademark) net.

Further, although the cover member 117 made of rubber was exemplified above as one example of the cover member according to the present invention, and the kind of rubber was not particularly specified, the rubber that forms the cover member according to the present invention may be, for example, a urethane-based rubber, a silicone-based rubber, or a fluorine rubber.

What is claimed is:

1. An RFID tag, comprising:
   a main unit comprising a base, a communication antenna that is wired on the base, and a circuit chip that is electrically connected to the antenna and performs radio communication via the antenna; and
   protective layers that sandwich the main unit from a front side and a rear side, and have greater slipperiness than a slipperiness between the main unit and a contactant.

2. The RFID tag according to claim 1, wherein the main unit comprises a cover member that covers the base, the antenna and the circuit chip.

3. The RFID tag according to claim 1, wherein the main unit comprises a chip reinforcing member that covers at least a periphery of the circuit chip and a part of a wiring of the antenna, at least in an upper side with respect to the base designated as a bottom.

4. The RFID tag according to claim 1, wherein the main unit comprises:
   a chip reinforcing member that covers at least a periphery of the circuit chip and a part of a wiring of the antenna with respect to at least an upper part when having the base as a bottom; and
   an underside reinforcing member that is disposed in a position that sandwiches the base with respect to the chip reinforcing member.

5. The RFID tag according to claim 3, wherein the chip reinforcing member covers only the periphery of the circuit chip and one part of a wiring of the antenna.

6. The RFID tag according to claim 4, wherein the chip reinforcing member covers only the periphery of the circuit chip and one part of a wiring of the antenna.

7. An RFID tag production method, comprising:
   a main unit preparation process that prepares a main unit comprising a base, a communication antenna that is wired on the base, and a circuit chip that is electrically connected to the antenna and performs radio communication via the antenna; and
   a protective layer formation process that forms at the same time as the main unit preparation process or after the main unit preparation process, protective layers that sandwich the main unit from a front side and a rear side and have greater slipperiness than a slipperiness between the main unit and a contactant.

8. The RFID tag production method according to claim 6, wherein the main unit preparation process is a process that prepares, as the main unit, a main unit that comprises a cover member that covers the base, the antenna and the circuit chip.

9. The RFID tag production method according to claim 6, wherein the main unit preparation process is a process that prepares, as the main unit, a main unit comprising a chip reinforcing member that covers at least a periphery of the circuit chip and a part of a wiring of the antenna with respect to at least an upper part when having the base as a bottom.

10. The RFID tag production method according to claim 6, wherein the main unit preparation process is a process that prepares, as the main unit, a main unit that includes a chip reinforcing member that covers at least a periphery of the circuit chip and a part of a wiring of the antenna with respect to at least an upper part when having the base as a bottom, and an underside reinforcing member that is disposed at a position that sandwiches the base with respect to the chip reinforcing member.

11. The RFID tag production method according to claim 8 or 9, wherein the main unit preparation process is a process that prepares, as the main unit, a main unit having a chip reinforcing member that covers only the periphery of the circuit chip and a part of the antenna wiring as the chip reinforcing member.

* * * * *